United States Patent [19]
Horne

[11] Patent Number: 5,295,259
[45] Date of Patent: Mar. 15, 1994

[54] DATA CACHE AND METHOD FOR HANDLING MEMORY ERRORS DURING COPY-BACK

[75] Inventor: Stephen C. Horne, Austin, Tex.

[73] Assignee: Advanced Micro Devices, Inc., Sunnyvale, Calif.

[21] Appl. No.: 650,681

[22] Filed: Feb. 5, 1991

[51] Int. Cl.$^5$ .............................................. G06F 1/00
[52] U.S. Cl. ............................ 395/575; 364/243.41; 364/243
[58] Field of Search ............. 395/575; 364/243, 243.3, 364/243.4, 245, 245.2, 243.41, 967, 964.341

[56] References Cited

U.S. PATENT DOCUMENTS

| | | | |
|---|---|---|---|
| 4,392,200 | 7/1983 | Arulpragasam et al. | 364/200 |
| 4,933,835 | 6/1990 | Sachs et al. | 364/200 |
| 4,995,041 | 2/1991 | Hetherington et al. | 395/575 |
| 5,025,366 | 6/1991 | Baror | 364/200 |
| 5,155,824 | 10/1992 | Edenfield et al. | 364/234.41 |
| 5,197,144 | 3/1993 | Edenfield et al. | 395/425 |

*Primary Examiner*—Charles E. Atkinson
*Assistant Examiner*—Trinh Tu
*Attorney, Agent, or Firm*—Foley & Lardner

[57] ABSTRACT

Apparatus and method of a data cache which provides for the handling of errors during data copy-back from a data cache write buffer to external memory in a processing system including a processor. When data requested by the processor at an addressed storage location of the data cache is data which is valid, modified, and other than the data requested by the processor, the data is first transferred to the data cache write buffer and then written back to external memory after the requested data is fetched from a memory bus. If an error occurs during the write back of the data from the write buffer to external memory, the data is transferred from the write buffer to the storage location of the data cache originally addressed by the processor before the memory bus is released.

4 Claims, 2 Drawing Sheets

DATA CACHE AND METHOD FOR HANDLING MEMORY ERRORS DURING COPY-BACK

BACKGROUND OF THE INVENTION

The present invention is generally directed to a data cache and method for use in a processing system of the type including at least one processor. The present invention is more particularly directed to such a data cache and method which provides for improved handling of errors encountered during attempted copy-back to external memory.

Data caches are well known in the art. Such caches are generally integrated with an associated processor for locally storing data required by the processor. Local storing of the data is advantageous because accesses by a processor to a local cache may be performed more quickly than accesses to external memory and because local accesses reduce the number of transactions which must be performed over an external memory bus.

In multi-processor systems which include a plurality of processors, each processor is generally integrated with an associated data cache. Each processor and data cache is coupled to external memory over a common memory bus.

When a processor of a multi-processor system writes new data into its local cache, the new data becomes "modified" with respect to the external memory and is so marked in the data cache. Even though such systems provide for consistency between the caches (some caches contain the same data), only the local cache receiving the new data marks the data as modified and is known as the "owner" of the data.

To further reduce the number of external memory accesses and to thereby maintain high processing performance, each cache performs a bus-watching function. If a processor associated with another cache issues a load instruction for requested data on the memory bus, and if a cache not associated with the requesting processor can provide the requested data, it will intervene before the external memory access and provide the requesting processor with the requested data over the memory bus. If no other cache intervenes, the external memory responds to provide the requested data over the memory bus.

Load instructions generally include lower order bits which form a multi-bit address and higher order bits which include a data identifier. Each storage location of each cache and of the external memory is assigned a unique address to permit the address bits to address the storage locations. Stored in each cache storage location, along with the data, is a multi-bit tag. When a cache receives a load instruction, either from its associated processor or over the memory bus from another cache, it compares the tag at the addressed storage location to the data identifier. If they match, the load instruction is said to "hit" in the cache and the cache can then supply the requested data. If the data identifier and the tag do not match, the load instruction is said to "miss" in that cache. If a load instruction misses in a local cache, the local cache then places the load instruction onto the memory bus to fetch the requested data from another cache or the external memory. If a load instruction received over the memory bus misses in a cache, that cache of course does not respond with data.

When a load instruction misses in a local cache, it is desirable for the local cache to fetch the requested data from the memory bus and store the data in the addressed storage location. This allows future load instructions for that memory location to be satisfied by the local cache without using the memory bus.

In addition to the data and the data tags stored in each cache storage location, each cache storage location also includes a validity bit to indicate if the stored data is valid and a modified bit to indicate if the stored data is modified. When a load instruction misses in a local cache, and the data stored in the addressed storage location is valid and modified, it is necessary to copy-back this data to the external memory before it is deleted. The simplest way to accomplish this replacement is to perform the copy-back to external memory before fetching the new data for the processor and storing the new data in the processor's local cache. However, in order to increase system performance, it has been more desirable to fetch the new data first to permit the processor to continue its executions and then to copy-back the valid and modified data while the processor continues to execute. To that end, data caches have also included a write buffer for temporarily storing the valid and modified data. This permits the new data to be provided to the processor and stored in the cache at the addressed storage location and the valid and modified data to then be copied-back to external memory. In accordance with at least one known processing system, the memory bus is held until the copy-back is completed.

A problem can arise, however, if an error is encountered during the copy-back process. Such an error may arise, for example, if the external memory is not able to accept the copied-back valid and modified data. One way to handle this situation is to leave the valid and modified data in the write buffer. However, this requires each cache to have the appropriate hardware to compare load instruction addresses to both the cache storage locations and the cache write buffer. Such hardware to perform this function is costly.

SUMMARY OF THE INVENTION

The present invention provides a data cache for use in a processing system of the type including a processor implemented in an integrated circuit, an external memory for storing data, and a memory bus coupling the processor to the external memory. The data cache is integrated with the processor within the integrated circuit and includes storage means including a plurality of addressable storage locations for storing data and a write buffer for temporarily storing data. The data cache further includes logic means responsive to a processor load request including a storage location address for requested data for determining whether the requested data is stored in the addressed storage location of the storage means and for causing the data presently stored in the addressed storage location to be stored in the write buffer when the presently stored data is valid data and other than the requested data. The data cache further includes read means responsive to the logic means for fetching the requested data from the memory bus when the requested data is not stored in the addressed storage location and for storing the requested data in the storage means addressed storage location and load means for conveying the requested data to the processor. The logic means is further arranged to cause the valid data to be conveyed from the write buffer to the external memory over the memory bus and is responsive to an error signal indicating unsuccessful conveyance of the valid data from the write buffer to the external memory to cause the valid data to be written back into the addressed storage location of the storage location.

The present invention further provides a method for use in a processing system of the type including a processor implemented in an integrated circuit, an external memory for storing data, a memory bus coupling the processor to the external memory, and a data cache integrated with the processor within the integrated circuit and including storage means including a plurality of addressable storage locations for storing data and a write buffer. The method provides for handling errors during copy-back of data from the cache to the external memory and includes the steps of receiving at the data cache a processor load request including a storage location address for requested data, determining whether the requested data is stored in the addressed storage location, transferring the data presently stored in the addressed storage location to the write buffer when the presently stored data is valid and other than the requested data, and fetching the requested data from the memory bus when the requested data is not stored in the addressed storage location. The method further includes the steps of storing the requested data in the addressed storage location, conveying the requested data to the processor, copying-back the valid data from the write buffer to the external memory over the memory bus and transferring the valid data back to the addressed storage location upon receipt of an error signal indicating unsuccessful copying-back of the valid data from the write buffer to the external memory.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION OF THE PREFERRED EMBODIMENT

Figure 1:
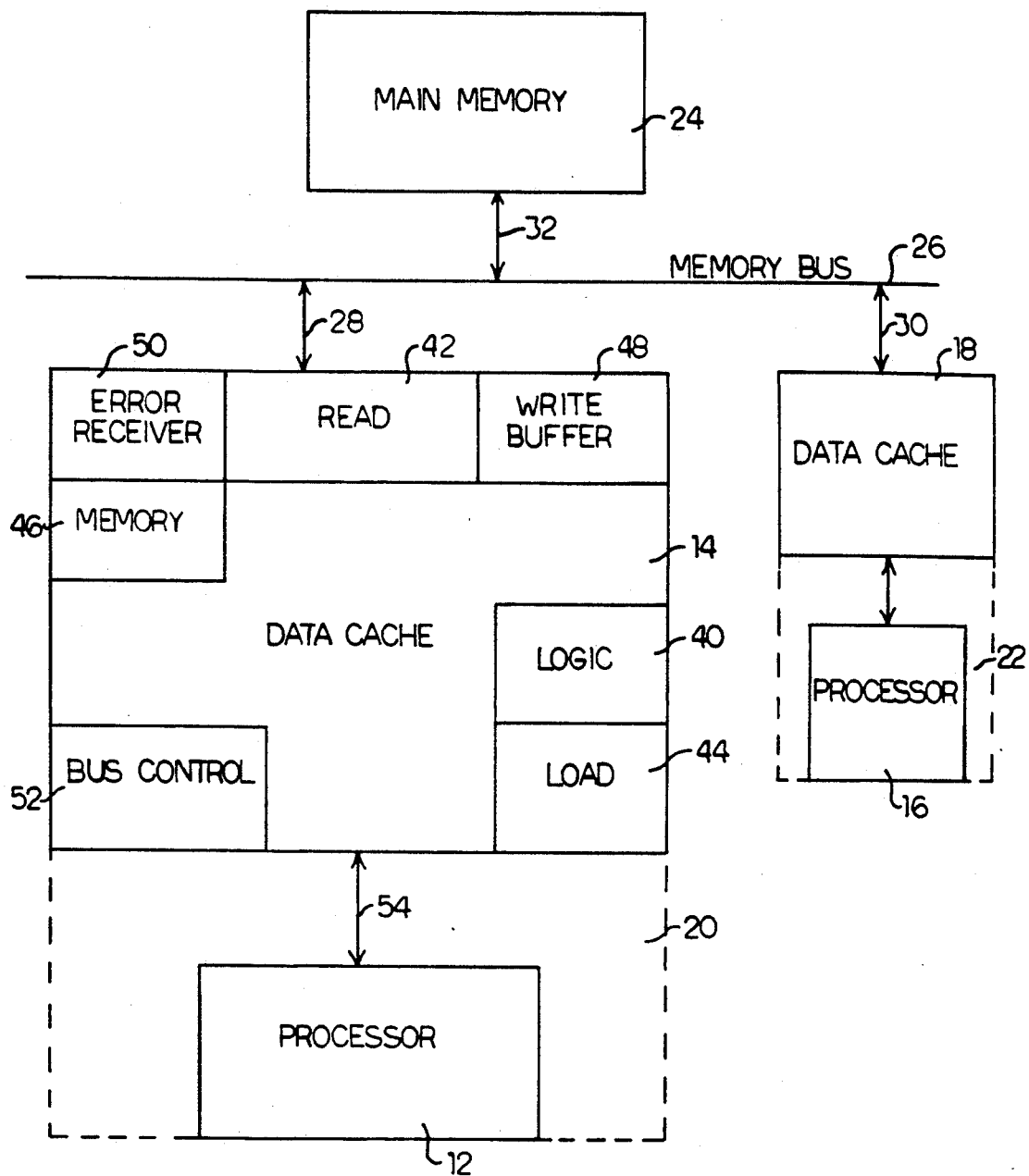
FIG. 1 is a block diagram of a processing system embodying the present invention.

Referring now to FIG. 1, it illustrates a processing system 10 embodying the present invention. The processing system 10 generally includes a first processor 12, a first data cache 14 associated with processor 12 and embodying the present invention, a second processor 16 and a second data cache 18 associated with the second processor 16 The first processor 12 and the first data cache 14 are preferably, and in accordance with the present invention, integrated together within a common integrated circuit 20. Similarly, the second processor 16 and its associated second data cache 18 are preferably integrated together within a common integrated circuit.

The processing system 10 further includes a main memory 24 which is integrated within a separate integrated circuit and thus is external to the first and second processor and data caches, and a memory bus 26. The first processor 12 and first data cache 14 are coupled to the memory bus 26 by a bi-directional bus 28. Similarly, the second processor 16 and second data cache 18 are coupled to the memory bus 26 by another bi-directional bus 30. The main memory 24 is coupled to the memory bus 26 by a still further bi-directional bus 32.

As is well known in the art, the first and second data caches 14 and 18 are utilized for storing data locally with respect to their associated first and second processors 12 and 16 respectively. When a processor requires a block of data, it issues a load instruction for requesting the required block of data. The load instruction is first received by the data cache associated with the requesting processor for providing the requested block of data to the requesting processor locally in the event that the associated data cache contains the requested block of data. This configuration reduces the number of transactions which must occur on the memory bus 26 and maintains high processing performance because the provision of data locally to a requesting processor requires less time than obtaining the data from the external memory 24 over the memory bus 26.

If a data cache associated with a requesting processor is unable to provide the requesting processor with the requested data, it will then place the entire load instruction onto the memory bus 26 for fetching the requested data from the memory bus which is provided by either another data cache or the external memory 24. As well known in the art, the data caches 14 and 18 are preferably arranged to perform a bus-watching function for load instructions from other processors. If a data cache sees a load instruction on the memory bus and is able to provide the requested data, it will intervene and provide the requested data before the external memory 24 is accessed. If none of the other caches in the processing system is able to provide the requested data, the external memory 24 then is accessed by the load instruction and provides the requested data to the requesting processor through its associated data cache. The data cache associated with the requesting processor receives the data from the external memory and stores the data locally and provides the data to its associated processor. In this manner, the requested data is now stored locally with respect to the requesting processor within its associated data cache so that when the block of data is once again required by the processor, it will be able to obtain the data locally from its associated data cache without requiring a memory access on the external bus 26.

Now that the operation of the data caches has been generally described, the operation of the data caches in accordance with the present invention will be described in greater detail. For purposes of this description, it should be understood that the present invention has applicability in single processor systems as well as multi-processor systems which include a plurality of processors. To that end, the data cache 18 is preferably identical to data cache 14 and, as a result, only data cache 14 will be described in detail. It should therefore be understood that the description of data cache 14 applies equally to data cache 18.

Data cache 14 generally includes a logic section 40 which functions to implement the operation of data cache 14 in accordance with the flow diagram to be described hereinafter with respect to FIG. 2, a read section 42, a load section 44, a memory section 46, a write buffer 48, an error receiver 50, and a bus control 52. The data cache 14 is coupled to its associated processor 12 over a bi-directional bus 54.

The memory section 46 forms an internal storage means of the data cache 14 which includes a plurality of addressable storage locations. Each of the caches preferably includes such a memory and the main memory 24 also includes a plurality of addressable storage locations. Each of the storage locations is arranged to store a block of data which comprises four 8-bit bytes of data. Each block contains a group of lower order bits which contain the data and a group of higher order bits which contain a data tag. When a processor requests a block of data, it provides a load instruction which includes a group of lower order bits containing the address of the storage location being accessed and a group of higher order bits which contain a data identifier. The data identifier is utilized by a data cache to determine if the data stored in the addressed storage location is the data requested by the requesting processor. To perform this function, the data cache receiving the instruction compares the data tag stored in the addressed storage location to the data identifier within the load instruction. If the data tag and the load instruction data identifier match, this indicates that the cache is able to provide the requested data. If the data tag and the load instruction data identifier do not match, this indicates that the cache is unable to provide the requested data.

Also stored within each storage location is a validity bit and a modified bit. The validity bit indicates that the data stored in the particular storage location is valid data. The modified bit indicates if the data stored in the particular storage location is modified data.

Each of the data caches in the processing system is arranged to maintain data consistency. In maintaining data consistency, some of the caches will be storing the same data. However, only the data cache most recently modifying the commonly stored data will have set the modified bit and thus will be considered the owner of the modified data. Each cache has the responsibility of preserving its valid and modified data within the processing system to prevent the valid and modified data from being deleted.

The read section 42 fetches the requested data from the memory bus 26 in the event that the cache 14 does not contain the data requested by the processor 12 within its memory 46. If the memory 46 does not contain the data requested by the processor 12, the read section 42 places the entire load instruction onto the memory bus 26 for fetching the requested data from another data cache of the processing system or from the external memory 24. The read section 42, upon receiving the requested data from the memory bus 26, conveys the requested data to the memory 46 for storing the requested data in the storage location addressed by the load instruction. Also, during the same cycle, the load section 44 conveys the requested data to the processor 12.

The write buffer 48 is arranged to temporarily store data which is to be written-back to the external memory 24. Such writing back of data to the external memory 24 is required when the data presently stored in a storage location addressed by the processor 12 is modified and valid data and data which is other than the data requested by the processor 12. The data presently stored in the addressed storage location is transferred to the write buffer 48 before the new data fetched from the memory bus 26 is written into the storage location addressed by the processor 12. This enables the data cache 14 to preserve the valid and modified data which would otherwise be deleted when the new and requested data is written into the storage location addressed by the processor 12 within the memory 46. After the data requested by the processor 12 is written into the addressed storage location of memory 46 and provided to the processor 12 from the load section 44, the write buffer 48 then writes-back the valid and modified data to the external memory 24.

The bus control 52 under control of the logic section 40 acquires the memory bus 26 prior to the fetching of the requested data by the read section 42 from the memory bus 26 and holds the memory bus 26 until the valid and modified data is written-back into the main memory 24 from the write buffer 48. This precludes another data cache from acquiring the memory bus before the foregoing operation is completed. If the bus control 52 did not hold the memory bus 26 until after the valid and modified data is written-back into the main memory 24, another data cache may acquire the memory bus with a load instruction from its associated processor requiring the data cache 14 to be configured with the necessary hardware for comparing the load instruction address to the storage location addresses of both the memory 46 and the write buffer 48. Such extra hardware is not required because access to the memory bus 26 cannot be obtained by another cache until the cache writing-back data into external memory has completed the write-back procedure.

The error receiver 50 of the data cache 14 is arranged to receive error messages from the memory bus 26 if an error is encountered during the write-back of data into external memory. Such an error message may arise, for example, where for some reason, the external memory 24 is unable to receive the valid and modified data being written-back to it. In accordance with the present invention, when an error occurs during the write-back of valid and modified data into the external memory 24, the valid and modified data is not permitted to remain in the write buffer. Instead, the valid and modified data within the write buffer 48 is transferred back to the memory 46 and is stored in the storage location addressed by the processor 12 in its load instruction. As a result, the valid and modified data originally stored in the addressed storage location is returned to the memory 46 within the addressed storage location and is thus written over the data requested by the processor 12 and newly acquired from the memory bus 26. In this manner, the data cache 14 will be left in a state that appears as if the copy-back had been attempted before the loading of the new block of data into the processor 12. Because the valid and modified data is not maintained in the write buffer 48, the extra hardware which would otherwise be required for comparing the load instruction addresses to the storage location addresses of the write buffer 48 is still not required. In furtherance of this end, and in accordance with the present invention, the bus control 52 continues to hold the bus 26 until the valid and modified data within the write buffer 48 is conveyed back to the storage location of memory 46 originally addressed by the processor 12. This further insures that bus-watching does not occur when the write buffer 48 contains the valid and modified data so that the aforementioned additional hardware is not needed.

Figure 2:
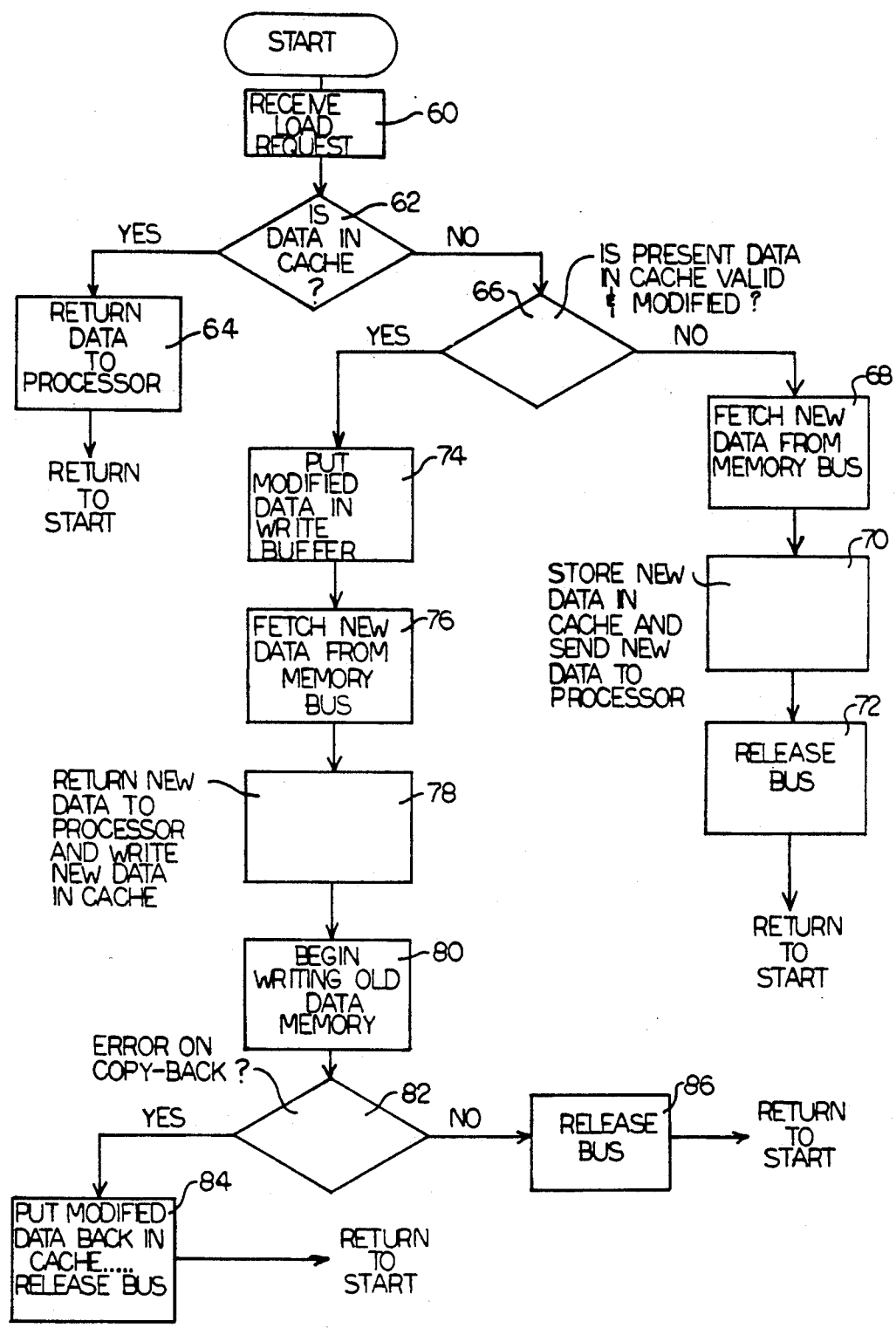
FIG. 2 is a flow diagram illustrating the manner in which the processing system of FIG. 1 may be implemented for practicing the present invention in accordance with a preferred embodiment of the present invention.

Referring now to FIG. 2, it illustrates a flow diagram of the steps performed within the data cache 14 under control of the logic section 40 in response to receiving a load instruction from the processor 12. The logic section 40 begins in step 60 by receiving a load instruction or request from the processor 12. In step 62, the logic section then determines if the data requested by the processor 12 is presently stored in the storage location of memory 46 addressed by the processor 12 in its load instruction. In performing this step, as previously described, the logic section 40 compares the data tag stored in the addressed storage location to the data identifier within the load instruction. If the data tag and the data identifier within the load instruction match, and if the valid bit is true, the logic section 40 then proceeds to step 64 to cause the requested data to be sent to the processor 12 from the memory 46 through the load section 44. The logic section then returns to start.

If it is determined in step 62 that the data requested by the processor 12 is not presently stored in the storage location of memory 46 addressed by the processor 12 in its load instruction, as indicated by the data tag not matching the data identifier in the load instruction, the logic section 40 then proceeds to step 66 to determine if the data presently stored within the addressed storage location of memory 46 is valid and modified. In performing this step, the logic section 40 determines if the validity bit and the modified bit stored at the addressed storage location have been set.

If the data presently stored in the addressed storage location is not valid and modified, the logic section then proceeds to step 68 for fetching the new and requested data from the memory bus. In performing this step, the logic section 40 causes the bus control 52 to first acquire the memory bus 26 and then causes the read section 42 to place the load instruction of the processor 12 onto the memory bus 26. In response to the load instruction placed on the memory bus 26, the read section 42 will receive the requested data from either another data cache which intervenes, such as data cache 18, or the external memory 24.

The logic section 40 then proceeds to step 70 to cause the read section 42 to convey the requested data to the memory 46 for storage in the storage location addressed by the processor 12 in its load instruction, and to cause the load section 44 to convey the ne and requested data to the processor 12. The logic section 40 then in step 72 causes the bus control 52 to release the memory bus 26 and then returns to start.

If, in step 66, the logic section 40 determines that the data presently stored in the memory 46 at the storage location addressed by the processor 12 in its load instruction is valid and modified, it will then, in accordance with the present invention, proceed to step 74 to cause the modified and valid data presently stored in the memory 46 at the addressed storage location to be conveyed to the write buffer 48. As previously mentioned, the valid and modified data stored in the memory 46 at the addressed storage location is not only valid and modified, but in addition, is data other than the data requested by the processor 12.

The logic section 40 then proceeds to step 76 to cause the read section 42 to fetch the requested data from the memory bus. In performing this step, the logic section 40 first causes the bus control 52 to acquire the memory bus before placing the load instruction of the processor 12 onto the memory bus 26.

Upon receipt of the requested data from either another cache or the external memory 24, the logic section then in step 78 causes the new data to be written into the memory 46 of data cache 14 within the storage location addressed by the processor 12. The logic section 40 also in step 78 causes the new and requested data to be loaded into the processor 12.

Once the processor 12 has received its requested data, the logic section 40 then in step 80 causes the write buffer 48 to convey the valid and modified data stored therein back to the external memory 24. This step is taken after the new data is loaded into the processor 12 to permit the processor to continue with its executions. This improves processing performance because the processor 12 is permitted to continue processing while the valid and modified data within the write buffer 48 is written-back into the main memory 24.

During the conveyance of the data from the write buffer 48 to the external memory 24, the logic section 40 causes the error receiver 50 to continue to detect for error messages associated with the write-back of the data in step 82. If the conveyance of the data is performed without error, the logic section then returns to start after causing the bus control 52 to release the memory bus 26 in step 86.

If during the conveyance of the data from the write buffer 48 an error message is received by the error receiver 50, indicating that, for example, the external memory 24 could not receive the data, the logic section then proceeds to step 84 wherein it causes the write buffer 48 to convey the valid and modified data stored therein to the memory 46 for storage within the storage location originally addressed by the processor 12 in its load instruction. Once the valid and modified data is transferred back from the write buffer to the memory 46, the logic section 40 causes the bus control 52 to release the bus and then returns to start.

As a result, if an error occurs during the write back procedure, the data attempted to be written back into the external memory is conveyed back to the memory 46 of data cache 14 and stored within the storage location originally addressed by the processor 12 in its load instruction. This is accomplished before the memory bus 26 is released by the bus control 52 to preclude bus-watching until after the data is returned to the memory 46 of the data cache 14. As a result, the present invention provides a system and method for handling errors occurring during the copy-back of data which not only precludes the data from being deleted, but in addition, negates the need for extra hardware for comparing load instructions to memory contents of both the memory of the data cache and the write buffer of the data cache. In accordance with the present invention, such extra hardware is not required for providing such comparisons with respect to the write buffer 48

While a particular embodiment of the present invention has been shown and described, modifications may be made, and it is therefore intended to cover in the appended claims all such changes and modifications which fall within the true spirit and scope of the invention.

What is claimed is:

1. A data cache for use in a processing system of the type including a processor implemented in an integrated circuit, an external memory for storing data, and a memory bus coupling said processor to said external memory, said data cache being integrated with said processor within said integrated circuit, said data cache comprising:

storage means, including a plurality of addressable storage locations, for storing data;
 a write buffer for temporarily storing data;

logic means coupled to said processor and being responsive to a load request generated by said processor, said load request identifying requested data required by said processor, said load request including a storage location address designating one of said plurality of storage locations of said storage means, said designated storage location containing presently stored data, said logic means determining whether said presently stored data is said requested data and causing said presently stored data to be stored in said write buffer as transferred data when said presently stored data is valid and modified, and is not said requested data;

read means, responsive to said logic means, for fetching said requested data from said memory bus when said presently stored data is not said requested data, and for storing said requested data in said designated storage location; and load means for conveying said requested data to said processor;

said logic means being further arranged to cause said transferred data to be conveyed from said write buffer to said external memory over said memory bus; said logic means being responsive to an error signal indicating unsuccessful conveyance of said transferred data from said write buffer to said external memory to cause said transferred data to be written back into said designated storage location.

2. A data cache as defined in claim 1 further including bus control means for acquiring said memory bus to enable the fetching of said requested data and wherein said bus control means is arranged to hold said memory bus until after said transferred data is written back into said designated storage location of said storage means.

3. In a processing system of the type including a processor implemented in an integrated circuit, an external memory for storing data, a memory bus coupling said processor to said external memory, and a data cache integrated with said processor within said integrated circuit and including storage means, including a plurality of addressable storage locations for storing data, and a write buffer, a method for handling errors during copy-back of data from said cache to said external memory and comprising the steps of:

receiving at said data cache a load request identifying requested data, said load request including a storage location address designating one of said plurality of storage locations of said storage means, said designated storage location containing presently stored data;

determining whether said presently stored data is said requested data;

transferring said presently stored data to said write buffer as transferred data when said presently stored data is valid and modified, and is not said requested data;

fetching said requested data from said memory bus when said presently stored data is not said requested data;

storing said requested data in said designated storage location;

conveying said requested data to said processor;

copying-back said transferred data from said write buffer to said external memory over said memory bus; and transferring said transferred data back to said designated storage location upon receipt of an error signal indicating unsuccessful copying-back of said transferred data from said write buffer to said external memory.

4. A method as defined in claim 3 further including the steps of acquiring said memory bus before the fetching of said requested data and holding said memory bus until after said transferred data is written back into said designated storage location.

* * * * *